(12) United States Patent
Lim et al.

(10) Patent No.: US 8,933,989 B2
(45) Date of Patent: Jan. 13, 2015

(54) REFERENCE PICTURE LIST CHANGING METHOD OF MULTI-VIEW VIDEO

(75) Inventors: Jae Hyun Lim, Seoul (KR); Yong Joon Jeon, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 13/265,657

(22) PCT Filed: Mar. 9, 2010

(86) PCT No.: PCT/KR2010/001453
§ 371 (c)(1),
(2), (4) Date: Nov. 29, 2011

(87) PCT Pub. No.: WO2010/123203
PCT Pub. Date: Oct. 28, 2010

(65) Prior Publication Data
US 2012/0069903 A1    Mar. 22, 2012

Related U.S. Application Data

(60) Provisional application No. 61/171,806, filed on Apr. 22, 2009, provisional application No. 61/221,100, filed on Jun. 29, 2009, provisional application No. 61/221,097, filed on Jun. 29, 2009.

(51) Int. Cl.
*H04N 13/00* (2006.01)
*H04N 19/61* (2014.01)
*H04N 19/70* (2014.01)
*H04N 21/434* (2011.01)
*H04N 19/597* (2014.01)
*H04N 21/44* (2011.01)
*H04N 7/32* (2006.01)

(52) U.S. Cl.
CPC ... *H04N 19/00769* (2013.01); *H04N 19/00781* (2013.01); *H04N 13/0066* (2013.01); *H04N 19/00884* (2013.01); *H04N 21/4347* (2013.01); *H04N 21/44004* (2013.01)
USPC ............................................. 348/43; 375/240

(58) Field of Classification Search
USPC ....................................................... 375/240
See application file for complete search history.

(56) References Cited

U.S. PATENT DOCUMENTS

| 7,710,462 B2 * | 5/2010 | Xin et al. ................... 348/218.1 |
| 2008/0117985 A1 | 5/2008 | Chen et al. |

(Continued)

FOREIGN PATENT DOCUMENTS

| WO | WO 2007/114611 A1 | 10/2007 |
| WO | WO 2008/023967 A1 | 2/2008 |

(Continued)

OTHER PUBLICATIONS

PCT International Search Report dated Nov. 1, 2010 for Application No. PCT/KR2010/001453, 14 pages.

(Continued)

*Primary Examiner* — Sath V Perungavoor
*Assistant Examiner* — Howard D Brown, Jr.
(74) *Attorney, Agent, or Firm* — Fish & Richardson P.C.

(57) ABSTRACT

Disclosed is a method of changing a reference picture list. The present invention includes parsing a profile identifier and a slice type from a multiview video bitstream, obtaining inter-view reference information based on the profile identifier, initializing a reference picture list using the inter-view reference information, and modifying the reference picture list in consideration of the slice type. Accordingly, the present invention defines profile information indicating a stereo video, thereby coding a multiview video signal more efficiently.

5 Claims, 18 Drawing Sheets

(56) References Cited

U.S. PATENT DOCUMENTS

| | | |
|---|---|---|
| 2008/0137742 A1* | 6/2008 | Chen et al. ............... 375/240.13 |
| 2009/0010323 A1* | 1/2009 | Su et al. ................... 375/240.01 |
| 2009/0168874 A1* | 7/2009 | Su et al. ................... 375/240.12 |
| 2009/0279608 A1 | 11/2009 | Jeon et al. |
| 2009/0296811 A1 | 12/2009 | Jeon et al. |
| 2010/0020870 A1 | 1/2010 | Jeon et al. |
| 2010/0026882 A1 | 2/2010 | Jeon et al. |
| 2010/0026883 A1 | 2/2010 | Jeon et al. |
| 2010/0026884 A1 | 2/2010 | Jeon et al. |
| 2010/0027653 A1 | 2/2010 | Jeon et al. |
| 2010/0027654 A1 | 2/2010 | Jeon et al. |
| 2010/0027659 A1 | 2/2010 | Jeon et al. |
| 2010/0027660 A1 | 2/2010 | Jeon et al. |
| 2010/0027682 A1 | 2/2010 | Jeon et al. |
| 2010/0046619 A1 | 2/2010 | Koo et al. |
| 2010/0074334 A1 | 3/2010 | Jeon et al. |
| 2010/0080293 A1 | 4/2010 | Jeon et al. |
| 2010/0086036 A1 | 4/2010 | Jeon et al. |
| 2010/0091843 A1 | 4/2010 | Jeon et al. |
| 2010/0091844 A1 | 4/2010 | Jeon et al. |
| 2010/0091883 A1 | 4/2010 | Jeon et al. |
| 2010/0091884 A1 | 4/2010 | Jeon et al. |
| 2010/0091885 A1 | 4/2010 | Jeon et al. |
| 2010/0091886 A1 | 4/2010 | Jeon et al. |
| 2010/0118933 A1* | 5/2010 | Pandit et al. ............. 375/240.01 |
| 2011/0001792 A1* | 1/2011 | Pandit et al. .................... 348/43 |

FOREIGN PATENT DOCUMENTS

| | | |
|---|---|---|
| WO | WO 2008/023968 A1 | 2/2008 |
| WO | WO 2008/047303 A2 | 4/2008 |
| WO | WO 2008/123917 A2 | 10/2008 |

OTHER PUBLICATIONS

European Search Report dated Mar. 5, 2013 for Application No. 10767218, 6 pages.

Ying Chen et al: "Buffer Requirement Analyses for Multiview Video Coding (Abstract)", 26. Picture Coding Symposium; Jul. 11, 2007-Sep. 11, 2007; Lisbon,, Nov. 7, 2007, XP030080385, *the whole document*.

Junyan Huo et al: "A Flexible Reference Picture Selection Method for Spatial DIRECT Mode in Multiview Video Coding", Image and Signal Processing, 2008. CISP '08. Congress on, IEEE, Piscataway, NJ, USA, May 27, 2008, pp. 268-272, XP031286560, ISBN: 978-0-7695-3119-9 *Section 3.2*.

* cited by examiner

FIG. 3

| S310 | seq_parameter_set_mvc_extension( ) { |
|---|---|
| S320 | if( profile_idc !=STEREO PROFILE){ |
| S330 | num_views_minus1 |
| | } |
| | ... |

FIG. 4

| S410 | seq_parameter_set_mvc_extension( ) { |
|---|---|
| S420 | num_views_minus1 |
|  | for(i=0;i <=num_views_minus1; i++) |
| S430 | view_id[ i ] |
|  | for(i = 1; i <=num_views_minus1; i++) { |
| S441 | num_anchor_refs_l0[ i ] |
|  | for(j = 0; j <num_anchor_refs_l0[ i ]; j++) |
| S442 | anchor_ref_l0[ i ][ j ] |
| S443 | if( profile_idc !=STEREO PROFILE){ |
| S444 | num_anchor_refs_l1[ i ] |
|  | for(j = 0;j <num_anchor_refs_l1[ i ]; j++) |
| S445 | anchor_ref_l1[ i ][ j ] |
|  | } |
|  | } |
|  | for(i = 1; i <=num_views_minus1; i++) { |
| S451 | num_non_anchor_refs_l0[ i ] |
|  | for(j = 0; j <num_non_anchor_refs_l0[ i ]; j++) |
| S452 | non_anchor_refs_l0[ i ][ j ] |
| S453 | if( profile_idc !=STEREO PROFILE){ |
| S454 | num_non_anchor_refs_l1[ i ] |
|  | for(j = 0; j <num_non_anchor_refs_l1[ i ]; j++) |
| S455 | non_anchor_ref_l1[ i ][ j ] |
|  | } |
|  | } |
|  | } |

FIG. 5

| | seq_parameter_set_mvc_extension( ) { |
|---|---|
| | num_views_minus1 |
| | for(i=0;i <=num_views_minus1; i++ ) |
| | view_id[ i ] |
| | for(i = 1; i <=num_views_minus1; i++ ) { |
| | num_anchor_refs_l0[ i ] |
| S510 | if( profile_idc != 128 && (profile_idc !=118 || constraint_set5_flag != 1 )) { |
| | for(j = 0; j <num_anchor_refs_l0[ i ]; j++ ) |
| | anchor_ref_l0[ i ][ j ] |
| S520 | num_anchor_refs_l1[ i ] |
| | for(j = 0;j <num_anchor_ref_l1[ i ]; j++ ) |
| S530 | anchor_ref_l1[ i ][ j ] |
| | } |
| | } |
| | for(i = 1; i <=num_views_minus1; i++ ) { |
| | num_non_anchor_refs_l0[ i ] |
| S540 | if( profile_idc != 128 && (profile_idc !=118 || constraint_set5_flag != 1 )) { |
| | for(j = 0; j <num_non_anchor_refs_l0[ i ]; j++ ) |
| | non_anchor_ref_l0[ i ][ j ] |
| S550 | num_non_anchor_refs_l1[ i ] |
| | for(j = 0; j <num_non_anchor_refs_l1[ i ]; j++ ) |
| S560 | non_anchor_ref_l1[ i ][ j ] |

FIG. 6

| | seq_parameter_set_mvc_extension( ) { |
|---|---|
| S610 | if( profile_idc !=STEREO PROFILE){ |
| | num_views_minus1 |
| | for(i=0;i <=num_views_minus1; i++ ) |
| | view_id[ i ] |
| | for(i = 1; i <=num_views_minus1; i++ ) { |
| | num_anchor_refs_l0[ i ] |
| | for(j = 0; j <num_anchor_refs_l0[ i ]; j++ ) |
| | anchor_ref_l0[ i ][ j ] |
| | num_anchor_refs_l1[ i ] |
| | for(j = 0;j <num_anchor_refs_l1[ i ]; j++ ) |
| | anchor_ref_l1[ i ][ j ] |
| | } |
| | for(i = 1; i <=num_views_minus1; i++ ) { |
| | num_non_anchor_refs_l0[ i ] |
| | for(j = 0; j <num_non_anchor_refs_l0[ i ]; j++ ) |
| | non_anchor_ref_l0[ i ][ j ] |
| | num_non_anchor_refs_l1[ i ] |
| | for(j = 0; j <num_non_anchor_refs_l1[ i ]; j++ ) |
| | non_anchor_ref_l1[ i ][ j ] |
| | } |
| | } |
| S620 | else { |
| | for( i = 0; i <= 1; i++ ) |
| S630 | view_id[ i ] |
| S640 | anchor_ref_flag |
| S650 | non_anchor_ref_flag |
| | } |

FIG. 7

| | seq_parameter_set_mvc_extension( ) { |
|---|---|
| | num_views_minus1 |
| | for(i=0;i<=num_views_minus1; i++ ) |
| | view_id[ i ] |
| S710 | if( profile_idc != 128 && (profile_idc !=118 \|\| constraint_set5_flag != 1 )) { |
| | for(i = 1; i <=num_views_minus1; i++ ) { |
| | num_anchor_refs_l0[ i ] |
| | for( j = 0; j < num_anchor_refs_l0[ i ]; j++ ) |
| | anchor_ref_l0[ i ][ j ] |
| | num_anchor_refs_l1[ i ] |
| | for( j = 0;j < num_anchor_refs_l1[ i ]; j++ ) |
| | anchor_ref_l1[ i ][ j ] |
| | } |
| | for(i = 1; i <=num_views_minus1; i++ ) { |
| | num_non_anchor_refs_l0[ i ] |
| | for( j = 0; j < num_non_anchor_refs_l0[ i ]; j++ ) |
| | non_anchor_ref_l0[ i ][ j ] |
| | num_non_anchor_refs_l1[ i ] |
| | for( j = 0; j < num_non_anchor_refs_l1[ i ]; j++ ) |
| | non_anchor_ref_l1[ i ][ j ] |
| | } |
| | } |
| S720 | else { |
| S730 | anchor_ref_l0_flag |
| S740 | non_anchor_ref_l0_flag |
| | } |
| | ... |
| | } |

FIG. 8

| | | |
|---|---|---|
| | seq_parameter_set_mvc_extension( ) { | |
| | num_views_minus1 | |
| | for(i=0;i <=num_views_minus1; i++ ) | |
| | view_id[i] | |
| S810 | stereo_flag | |
| S820 | if( !stereo flag ) { | |
| | for(i = 1; i <=num_views_minus1; i++ ) { | |
| | num_anchor_refs_l0[ i ] | |
| | for(j = 0; j <num_anchor_refs_l0[ i ]; j++ ) | |
| | anchor_ref_l0[ i ][ j ] | |
| | num_anchor_refs_l1[ i ] | |
| | for(j = 0;j <num_anchor_refs_l1[ i ]; j++ ) | |
| | anchor_ref_l1[ i ][ j ] | |
| | } | |
| | for(i = 1; i <=num_views_minus1; i++ ) { | |
| | num_non_anchor_refs_l0[ i ] | |
| | for(j = 0; j <num_non_anchor_refs_l0[ i ]; j++ ) | |
| | non_anchor_ref_l0[ i ][ j ] | |
| | num_non_anchor_refs_l1[ i ] | |
| | for(j = 0; j <num_non_anchor_refs_l1[ i ]; j++ ) | |
| | non_anchor_ref_l1[ i ][ j ] | |
| | } | |
| | } | |
| S830 | else { | |
| S840 | anchor_ref_l0_flag | |
| S850 | non_anchor_ref_l0_flag | |
| | } | |
| | ... | |
| | } | |

FIG. 9

| | | |
|---|---|---|
| | seq_parameter_set_mvc_extension( ) { | |
| | num_views_minus1 | |
| | for(i=0;i<=num_views_minus1; i++) | |
| | view_id[i] | |
| S910 | stereo_flag | |
| | for(i = 1; i <=num_views_minus1; i++) { | |
| | num_anchor_refs_l0[ i ] | |
| | for(j = 0; j <num_anchor_refs_l0[ i ]; j++) | |
| | anchor_ref_l0[ i ][ j ] | |
| S920 | if( !stereo_flag ) { | |
| S930 | num_anchor_refs_l1[ i ] | |
| | for(j = 0;j <num_anchor_refs_l1[ i ]; j++) | |
| S940 | anchor_ref_l1[ i ][ j ] | |
| | } | |
| | } | |
| | num_non_anchor_refs_l0[ i ] | |
| | for(j = 0; j <num_non_anchor_refs_l0[ i ]; j++) | |
| | non_anchor_ref_l0[ i ][ j ] | |
| S950 | if( !stereo_flag ) { | |
| S960 | num_non_anchor_refs_l1[ i ] | |
| | for(j = 0; j <num_non_anchor_refs_l1[ i ]; j++) | |
| S970 | non_anchor_ref_l1[ i ][ j ] | |
| | } | |
| | } | |
| | . . . | |
| | } | |

FIG. 10
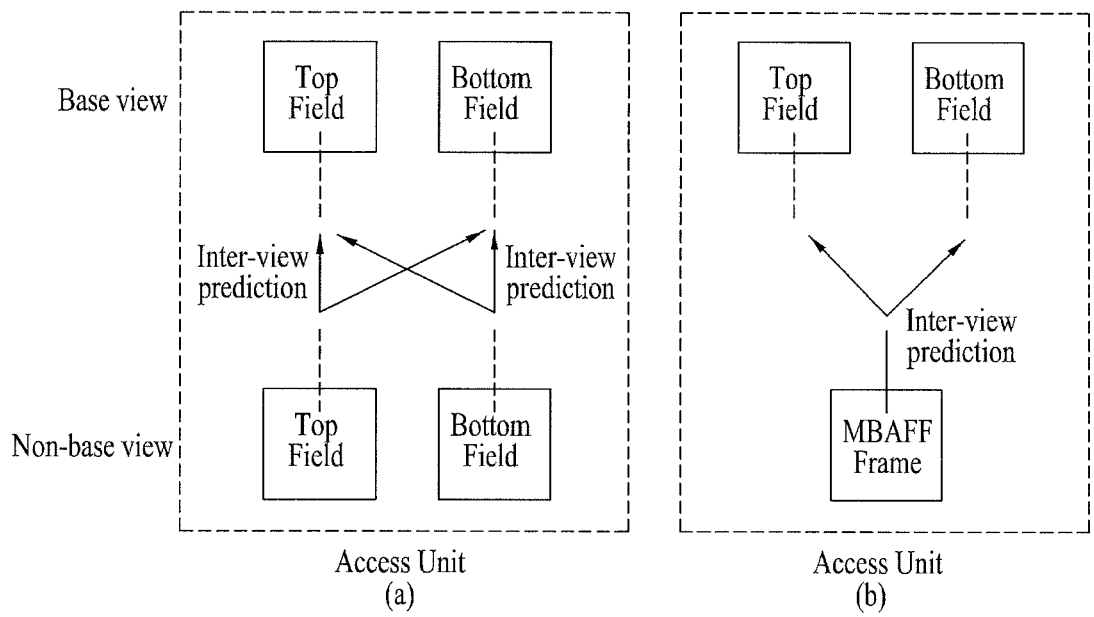
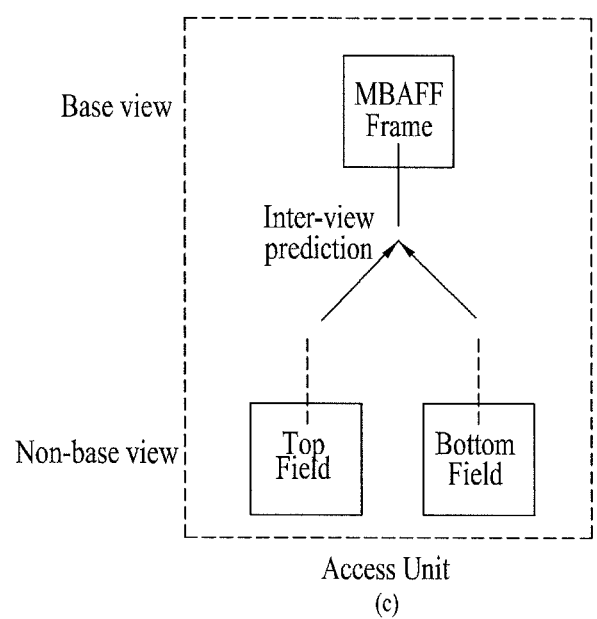

FIG. 13

| refIdxLX | 0 | 1 | 2 | 3 | 4 | 5 |
|---|---|---|---|---|---|---|
| view_id | 1 | 1 | 1 | 1 | 0 | 0 |

Top   Bottom
                              field   field (a)

| refIdxLX | 0 | 1 | 2 | 3 | 4 | 5 |
|---|---|---|---|---|---|---|
| view_id | 1 | 1 | 1 | 1 | 0 | 0 |

Bottom  Top
                            field    field (b)

Case that a picture of a non-base view is a top field

| refIdxLX | 0 | 1 | 2 | 3 | 4 | 5 |
|---|---|---|---|---|---|---|
| view_id | 1 | 1 | 1 | 1 | 0 | 0 |

Top   Bottom
                              field   field (c)

Case that a picture of a non-base view is a bottom field

| refIdxLX | 0 | 1 | 2 | 3 | 4 | 5 |
|---|---|---|---|---|---|---|
| view_id | 1 | 1 | 1 | 1 | 0 | 0 |

Bottom  Top
                          field    field (d)

FIG. 16

| | ref_pic_list_mvc_modification( ) { | C | Descriptor |
|---|---|---|---|
| S1610 | if( slice_type % 5 != 2 && slice_type != 4 ) { | | |
| | ref_pic_list_modification_flag_l0 | 2 | u(1) |
| | if( ref_pic_list_modification_flag_l0) | | |
| | do { | | |
| | modification_of_pic_nums_idc | 2 | ue(v) |
| | if( modifacation_of_pic_nums_idc == 0 \|\| modifacation_of_pic_nims_idc == 1 ) | | |
| | abs_diff_pic_num_minus1 | 2 | ue(v) |
| | else if( modifacation_of_pic_nums_idc == 2 ) | | |
| | long_term_pic_num | 2 | ue(v) |
| S1620 | else if( ( modifacation_of_pic_nums_idc == 4 \|\| modifacation_of_pic_nums_idc == 5 ) && profile_idc != 128 ) | | |
| S1630 | abs_diff_view_idx_minus1 | 2 | ue(v) |
| | } while( modifacation_of_pic_nums_idc != 3 ) | | |
| | } | | |
| S1640 | if( slice_type % 5 == 1 ) { | | |
| | ref_pic_list_modification_flag_l1 | 2 | u(1) |
| | if( ref_pic_list_modification_flag_l1) | | |
| | do { | | |
| | modification_of_pic_nums_idc | 2 | ue(v) |
| | if( modifacation_of_pic_nums_idc == 0 \|\| modifacation_of_pic_nims_idc == 1 ) | | |
| | abs_diff_pic_num_minus1 | 2 | ue(v) |
| | else if( modifacation_of_pic_nums_idc == 2 ) | | |
| | long_term_pic_num | 2 | ue(v) |
| S1650 | else if( ( modifacation_of_pic_nums_idc == 4 \|\| modifacation_of_pic_nums_idc == 5 ) && profile_idc != 128 ) | | |
| S1660 | abs_diff_view_idx_minus1 | 2 | ue(v) |
| | } while( modifacation_of_pic_nums_idc != 3 ) | | |
| | } | | |
| | } | | |

FIG. 17

| | ref_pic_list_mvc_modification( ) { | C | Descriptor |
|---|---|---|---|
| | if( slice_type % 5 != 2 && slice_type != 4 ) { | | |
| | ref_pic_list_modification_flag_l0 | 2 | u(1) |
| | if( ref_pic_list_modification_flag_l0) | | |
| | do { | | |
| | modification_of_pic_nums_idc | 2 | ue(v) |
| | if( modifacation_of_pic_nums_idc == 0 \|\| modifacation_of_pic_nums_idc == 1 ) | | |
| | abs_diff_pic_num_minus1 | 2 | ue(v) |
| | else if (( modifacation_of_pic_nums_idc == 2 ) | | |
| | long_term_pic_num | 2 | ue(v) |
| S1710 | else if( ( modifacation_of_pic_nums_idc == 4 \|\| modifacation_of_pic_nums_idc == 5 ) && ( profile_idc != 128 && ( profile_idc != 118 \|\| constraint_set5_flag != 1 ))) | | |
| S1720 | abs_diff_view_idx_minus1 | 2 | ue(v) |
| | } while( modifacation_of_pic_nums_idc != 3 ) | | |
| | } | | |
| | if( slice_type % 5 == 1 ) { | | |
| | ref_pic_list_modification_flag_l1 ) | 2 | u(1) |
| | if( ref_pic_list_modification_flag_l1) | | |
| | do { | | |
| | Modification_of_pic_nums_idc | 2 | ue(v) |
| | if( modifacation_of_pic_nums_idc == 0 \|\| modification_of_pic_nims_idc == 1 ) | | |
| | abs_diff_pic_num_minus1 | 2 | ue(v) |
| | else if( modifacation_of_pic_nums_idc == 2 ) | | |
| | long_term_pic_num | 2 | ue(v) |
| S1730 | else if( ( modifacation_of_pic_nums_idc == 4 \|\| modifacation_of_pic_nums_idc == 5 ) && ( profile_idc != 128 && ( profile_idc != 118 \|\| constraint_set5_flag != 1 ))) | | |
| S1740 | abs_diff_view_idx_minus1 | 2 | ue(v) |
| | } while( modifacation_of_pic_nums_idc != 3 ) | | |
| | } | | |

# REFERENCE PICTURE LIST CHANGING METHOD OF MULTI-VIEW VIDEO

TECHNICAL FIELD

The present invention relates to a multiview video signal processing technique.

BACKGROUND ART

Compression coding means a series of signal processing techniques for transmitting digitalized information via a communication circuit or saving the digitalized information in a form suitable for a storage medium. As targets of compression coding, there are audio, video, characters, etc. In particular, a technique for performing compression coding on a video is called video sequence compression. A video sequence is generally characterized in having spatial redundancy and temporal redundancy.

DISCLOSURE OF THE INVENTION

Technical Task

Accordingly, the present invention is directed to a method of changing a reference picture list of a multiview video that can substantially enhance efficiency in processing a multiview video signal.

Technical Solution

The present invention is to provide a method and apparatus for decoding a multiview video signal, by which the multiview video signal may be more efficiently decoded by checking inter-view dependency based on profile information indicating a multiview video stream.

The present invention is to provide a method and apparatus for decoding a stereo video signal, by which the stereo video signal may be more efficiently decoded by defining profile information indicating a stereo video.

The present invention is to provide a method and apparatus for decoding a multiview video signal, by which the multiview video signal may be more efficiently decoded by defining header information (e.g., NAL unit header information, sequence parameter information, picture parameter information, slice header information, etc.) based on profile information indicating a stereo video.

The present invention is to efficiently code a multiview video signal by defining an inter-view prediction flag indicating whether a coded picture of a current NAL unit is used for an inter-view prediction based on profile information indicating a stereo video.

The present invention is to efficiently code a multiview video signal by obtaining an inter-view reference information indicating an inter-view dependency relation based on profile information indicating a stereo video and by generating and managing a reference picture list using the obtained inter-view reference information.

The present invention is to efficiently code a multiview video signal by providing a method of managing reference pictures used for an inter-view prediction based on profile information indicating a stereo video.

Advantageous Effects

The present invention defines profile information indicating a stereo video, thereby coding a multiview video signal more efficiently. And, the present invention defines header informations (e.g., NAL unit header information, sequence parameter information, picture parameter information, slice header information, etc.) based on a profile information indicating a stereo video, by which the number of bits to be transmitted may be decremented and by which a coding speed may be enhanced in a manner of reducing a burden of a DPB (decoded picture buffer). Moreover, the present invention uses various kinds of configuration informations on a multiview video based on profile information indicating a stereo video, thereby enabling more efficient coding.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 3 to 9 are diagrams of syntax for limiting coding of multiview video coding information in decoding a stereo video according to embodiments of the present invention.

FIG. 10 is a diagram of a reference picture for inter-view prediction in accordance with a coding format of a picture in a base view and a picture in a non-base view according to an embodiment of the present invention.

FIG. 13 is a diagram for a method of assigning a reference index to a picture in a base view, if the picture in the base view is coded into a field, according to an embodiment of the present invention.

FIGS. 16 to 18 are diagrams for syntax of modifying a picture list referred to for temporal or inter-view prediction.

BEST MODE

Figure 1:
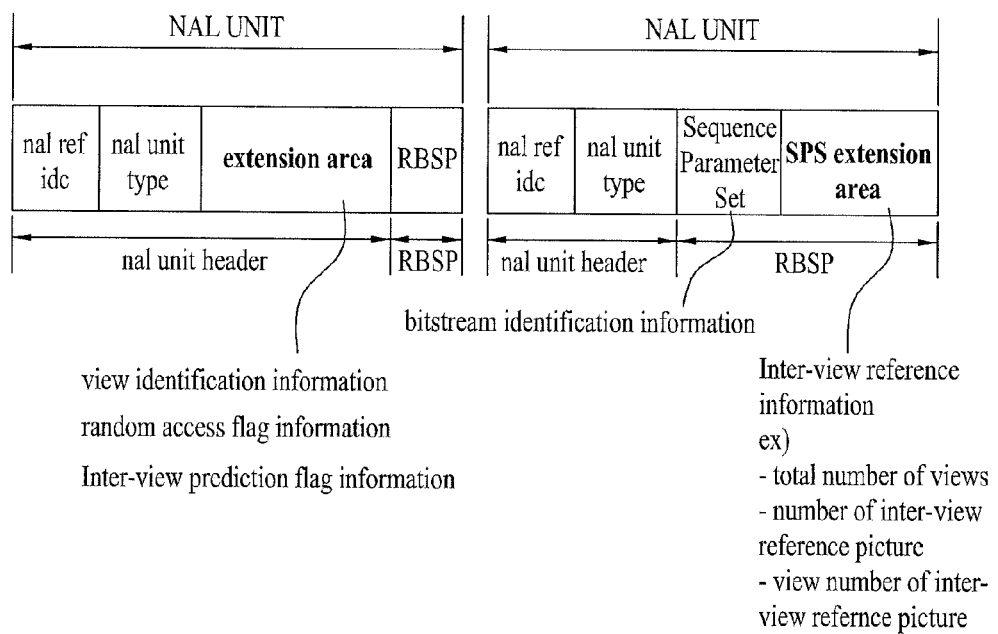
FIG. 1 is a diagram for one example of a configuration of NAL unit to add configuration information on a multiview video.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of changing a reference picture list according to the present invention may include the steps of parsing a profile identifier and a slice type from a multiview video bitstream, obtaining inter-view reference information based on the profile identifier, initializing a reference picture list using the inter-view reference information, and modifying the reference picture list in consideration of the slice type.

According to the present invention, if the multiview video bitstream is a stereo video coded bitstream in accordance with the profile identifier, the inter-view reference information may be obtained.

According to the present invention, the inter-view reference information may include flag information indicating whether a random access picture is used for an inter-view prediction and flag information indicating whether a non-random access picture is used for the inter-view prediction.

According to the present invention, the random access may include a coded picture in which all slices only refer to slices within a same access unit and the non-random access picture may include a picture except the random access picture.

According to the present invention, the present invention includes the steps of obtaining flag information whether to modify the reference picture list, obtaining a reference picture modification information based on the flag information, parsing a difference value of a picture number, a long-term picture number and a difference value of a view information, and deriving a modified reference index using the difference value of the picture number, the long-term picture number and the difference value of the view information, wherein if the slice type is not an I slice, the reference picture list is modified.

According to the present invention, the reference picture modification information may include an information for specifying a reference picture changed among reference pictures of the initialized reference picture list, the difference value of the picture number may indicate a difference between a picture number of a current picture and a predicted picture number, the predicted picture number may include a index of a reference picture assigned just before, the difference value of the view information may mean a difference between a view index of the current picture and a predicted view index, and the predicted view index may include a view index of the reference picture assigned just before.

According to the present invention, the difference value of the view information may be parsed based on the reference picture information and the profile identifier.

According to the present invention, if the reference picture is a short-term reference picture, the modified reference number may be derived based on a difference value between a predicted picture number and the picture number. If the reference picture is a long-term reference picture, the modified reference number may be derived based on the long-term picture number.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

Compression coding of video signal data considers spatial redundancy, spatial redundancy, scalable redundancy, and inter-view redundancy. Compression coding scheme, which takes inter-view redundancy into consideration, is just an embodiment of the present invention. And, the technical idea of the present invention is applicable to temporal redundancy, scalable redundancy, and the like. In this disclosure, coding may include both concepts of encoding and decoding, which may. And, coding may be flexibly interpreted to correspond to the technical idea and scope of the present invention.

First of all, a video format of a video signal may be described as follows. In H.264/AVC, interlaced scanning is supported as a video format of a video signal. The interlaced scanning is a scheme of performing a scanning in a manner of dividing pixel lines into even lines and odd lines. In particular, the interlaced scanning is performed by being divided into 2 field signals. In an interlaced signal, one frame is constructed with 2 fields including a top field and a bottom field. The top field is one of the 2 fields configuring one frame, which is spatially situated above the other. And, the bottom field is one of the 2 fields configuring one frame, which is spatially situated below the other. When the interlaced signal is coded, it may be coded in a manner of determining a frame picture or a field picture for each picture. In doing so, it may be able to determine a frame picture or a filed picture for each picture using a picture coding structure flag (field_pic_flag). In particular, the picture coding structure flag may include a flag that indicates whether a current picture is a frame picture or a field picture. The picture coding structure flag may be able to indicate a coding structure of a current picture by a unit of slice in the current picture by obtaining a slice level. The frame picture may mean a picture that is processed in a manner of collecting the 2 fields to configure one frame. And, the field picture may mean a picture that is processed in a manner of configuring 2 independent pictures with the 2 fields.

In case of a field picture, a macroblock in the field picture may be coded into a field. This may be called a field macroblock. In case of a frame picture, a macroblock in the frame picture may be coded into a frame. This may be called a frame macroblock. Moreover, regarding a frame picture, coding may be performed in a manner of switching a frame coding and a field coding to each other by a unit of 2 macroblocks vertically attached to each other in the frame picture. This may be called MB-AFF (macroblock-adaptive frame-field coding). For the MB-AFF, it may be able to use a field frame switch flag (mb_adaptive_frame_field_flag). In particular, the field frame switch flag (mb_adaptive_frame_field_flag) may mean a flag that indicates whether there is a switching between a frame macroblock and a field macroblock in a picture.

FIG. 1 is a diagram for one example of a configuration of NAL unit to add configuration information on a multiview video.

Referring to FIG. 1, NAL unit may basically include two parts, i.e., a header of the NAL unit and an RBSP (raw byte sequence payload, i.e., result data of video compression). The header of the NAL unit may include identification information (nal_ref_idc) indicating whether a slice of a reference picture is included in the NAL unit and an information (nal_unit_type) indicating a type of the NAL unit. Moreover, an extension area of the NAL unit header may be limitedly included. For instance, if the information indicating the type of the NAL unit is associated with scalable video coding or indicates a prefix NAL unit, the NAL unit may include an extension area of the NAL unit header. Moreover, in the extension area of the NAL unit header, configuration information on a multiview video may be added in accordance with flag information identifying a presence or non-presence of a multiview-video-coded bitstream.

For another instance, if the information indicating the type of the NAL unit is information indicating a sequence parameter set, the RBSP may include information on the sequence parameter set. In this case, the sequence parameter set may include an extension area of the sequence parameter set according to profile information. For example, if profile information is a profile relevant to a multiview video coding or a stereo video coding, the sequence parameter set may include an extension area of the sequence parameter set. Alternatively, a subset sequence parameter set may include an extension area of a sequence parameter set according to profile information. The extension area of the sequence parameter set may include inter-view reference information indicating inter-view dependency relation and information related to a level of a bitstream.

Various configuration informations on a multiview video (e.g., configuration information that can be included in an extension area of NAL unit header and configuration information that can be included in an extension area of a sequence parameter set) are explained in detail as follows.

First of all, view identification information may mean information for discriminating a picture in a current view from a picture in a different view. When a video sequence signal is coded, POC (picture order count) and 'frame_num' are used to identify a picture. In case of a multiview video, inter-view prediction may be used. So, identification information for discriminating a picture in a current view from a picture in a different view may be necessary. The view identification information may be obtained from a header area of a video signal. For instance, the header area may include a NAL header area, an extension area of a NAL header, or a slice header area. Information on a picture in a view different from that of a current picture is obtained using the view identification information, and it may be able to decode the video signal using the information on the picture in the different view. In particular, this view identification information may be applicable to an overall encoding/decoding process of the video signal. For instance, view identification information may be used to indicate an inter-view dependency relation. Number information of inter-view reference pictures, view identification information of an inter-view reference picture and the like may be needed to indicate the inter-view dependency relation. Informations used to indicate the inter-view dependency relation may be named inter-view reference information. The view identification information of the inter-view reference picture may mean information indicating a specific view used for inter-view prediction. And, the specific view may mean a view to which an inter-view reference picture used for the inter-view prediction belongs. In this case, the inter-view prediction may mean a prediction using a decoded sample of an inter-view reference picture in a view different from that of a current picture in coding the current picture and the current picture and the inter-view reference picture may belong to the same access unit. In this case, the access unit is a set of pictures existing on the same time zone and the pictures may be defined as having a same picture order count. In case that the picture is divided into a plurality of slices, it may be regarded as a set of slices. The inter-view reference picture may mean a reference picture used in performing inter-view prediction on a current picture. And, the view identification information may be intactly applied to multiview video coding using 'frame_num' that considers a view instead of considering a specific view identifier.

Random access flag information may mean information identifying whether a coded picture of a current NAL unit is a random access picture. In this case, the random access picture may mean a coded picture in which all slices only refer to slices within a same access unit. In particular, the random access picture performs an inter-view prediction for coding with reference to a slice in a different view but does not perform an inter-prediction for coding with reference to a slice in a current view. When inter-view reference information is obtained for an inter-view prediction, it may be obtained in accordance with a random access picture or a non-random access picture from a data area of a video signal. For instance, it may be obtained from a sequence parameter set area. After the number of all views has been obtained, it may be able to obtain view identification information for identifying each view based on the number of all views. And, number information of inter-view reference pictures, which indicates the number of reference pictures for a reference direction of each view, can be obtained. And, it may be able to obtain view identification information of each inter-view reference picture in accordance with the number information of the inter-view reference pictures. Through this method, the inter-view reference information may be obtained. And, the inter-view reference information may be obtained in a manner of being categorized into a case of a random access picture and a case of a non-random access picture. This can be known using random access flag information indicating whether a coded slice in a current NAL corresponds to a random access picture. This random access flag information may be obtained from an extension area of NAL header or a slice layer area. Moreover, when a reference picture list for an inter-view prediction is generated, it may be able to use inter-view reference information obtained in accordance with the random access flag information. And, the reference picture list for the inter-view prediction may be added to the reference picture list. For instance, when a reference picture list for an inter-view prediction is initialized or modified, it may be able to use the inter-view reference information. And, it may be also used to manage the added reference pictures for the inter-view prediction. For instance, by dividing the reference pictures into a random access picture and a non-random access picture, it may be able to make a mark indicating that reference pictures failing to be used in performing inter-view prediction shall not be used. And, the random access flag information may be applicable to a hypothetical reference decoder.

Inter-view prediction flag information may mean information indicating whether a coded picture of a current NAL unit is used for inter-view prediction. The inter-view prediction flag information may be usable for temporal prediction or inter-view prediction. In this case, identification information indicating whether NAL unit includes a slice of a reference picture may be used together. For instance, although a current NAL unit fails to include a slice of a reference picture according to the identification information, if it is used for inter-view prediction, the current NAL unit may correspond to a reference picture used for inter-view prediction only. According to the identification information, if a current NAL unit includes a slice of a reference picture and is used for inter-view prediction, the current NAL unit may be used for temporal prediction and inter-view prediction. Although NAL unit fails to include a slice of a reference picture according to the identification information, it may be saved in a decoded picture buffer. This is because, in case that a coded picture of a current NAL unit is used for inter-view prediction according to the inter-view prediction flag information, it may be necessary to be saved. Aside from a case of using both of the flag information and the identification information together, one identification information may be able to indicate whether a coded picture of a current NAL unit is used for temporal prediction or/and inter-view prediction.

Temporal level information means information on a hierarchical structure to provide temporal scalability from a video signal. Through the temporal level information, it is able to provide a user with a video on a specific time zone. Priority identification information means information identifying a priority by NAL unit. For instance, in case that a user requests a video in a specific view on a specific time zone, it may be able to obtain a bitstream (hereinafter named a sub-bitstream) according to the request. It may be able to obtain the sub-bitstream using view identification information and temporal level information, which are related to a view and time desired by a user, the above-mentioned inter-view reference information and the like. The priority information is assigned to the sub-bitstream by NAL unit and may be able to indicate a corresponding priority in decoding a picture coded by the NAL unit.

Figure 2:
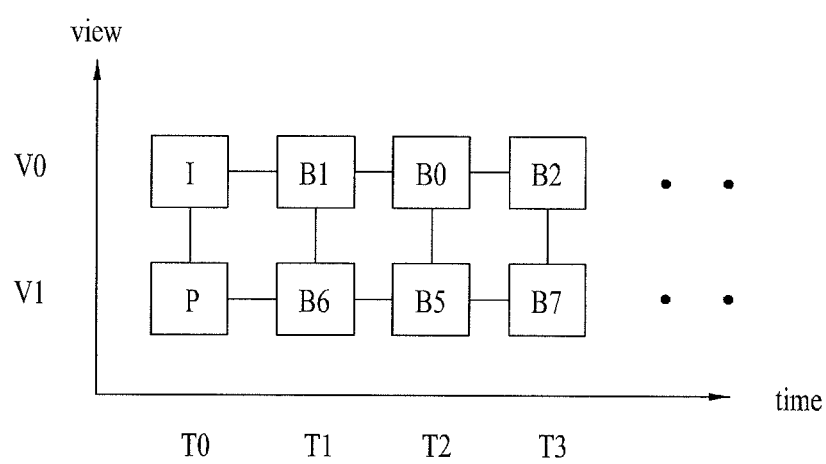
FIG. 2 is a diagram for a prediction structure of a stereo video according to an embodiment of the present invention.

FIG. 2 is a diagram for a prediction structure of a stereo video according to an embodiment of the present invention.

If a user intends to decode two views only from a multiview video, a prediction structure shown in FIG. 2 may be provided. In this case, the two views may include a base view and a non-base view. And, the base view may mean a view that can be coded independently from other views. In particular, the base view may mean a view that becomes a base of decoding among multiple views. Namely, the base view may correspond to a reference view for predicting a video in a different view. Alternatively, the base view may mean at least one view for compatibility with a conventional decoder (e.g., H.264/AVC, MPEG-2, MPEG-4, etc.). A sequence of the base view may be coded by a video codec scheme (e.g., MPEG-2, MPEG-4, H.26L series, etc.) to be formed as an independent bitstream. And, the non-base view may mean a view that is not the base view. Referring to FIG. 2, T0 to T3 on a horizontal axis indicate frames according to times and V0 and V1 on a vertical axis may indicate frames according to views, respectively. Arrows shown in FIG. 2 may indicate prediction directions of pictures, respectively. And, a numeral within each picture may be one example of indicating a decoding order only. Thus, assuming that two views exist only, one view V0 may become a base view and the other view V1 may become a non-base view. Hence, the base view V0 may be usable as a reference view of the non-base view V1 but the non-base view V1 is unable to become a reference view of another view. This is because the base view V0 is an independently codable view. Therefore, if a stereo video is decoded in the above-mentioned manner, it may be able to raise coding efficiency by restricting coding of informations necessary for multiview video coding.

FIGS. 3 to 9 are diagrams of syntax for limiting coding of multiview video coding information in decoding a stereo video according to embodiments of the present invention.

In case that a profile identifier of a received bitstream indicates a bitstream coded as a stereo video, the received bitstream may include 2 view videos. Hence, information indicating the number of all views in the inter-view reference information may be set to a value that always indicates 2 views only. In this case, the information indicating the number of views obtained from an extension area of a sequence parameter may not be transmitted. In particular, only if the profile identifier of the received bitstream does not indicate a bitstream coded as a stereo video, the corresponding information may be transmitted.

Referring to FIG. 3, it may be able to check whether a profile identifier of a received bitstream indicates a bitstream coded as a stereo video [S320]. If the profile identifier indicates the bitstream coded as the stereo video, it may be able not to obtain the information (num_views_minus1) indicating the number of all views. On the contrary, if the profile identifier of the received bitstream does not indicate the bitstream coded as the stereo video, i.e., if the profile identifier indicates a bitstream coded as a multiview video, it may be able to obtain the information indicating the number of all views [S330]. In this case, the information indicating the number of all views may include the information indicating that at least 3 view videos exist. And, the information indicating the number of views may be obtained from an extension area of a sequence parameter set [S310].

According to another embodiment of the present invention, if a profile identifier of a received bitstream indicates a bitstream coded as a stereo video, information related to a direction L1 in inter-view reference information may not be transmitted in some cases. As mentioned in the foregoing description with reference to FIG. 2, since the number of all views is 2 only, in case of a non-base view V1 refers to a base view V0. In particular, the non-base view V1 has an inter-view reference picture in a direction L0 only. Hence, the information related to the direction L1 in the inter-view reference information may not be always obtained. In particular, only if the profile identifier of the received bitstream does not indicate a bitstream coded as a stereo video, the corresponding information may be set to be obtained. Meanwhile, whether to obtain the information related to the direction L1 may be taken into consideration in a manner of being classified into a case that a current slice is a random access picture and a case that a current slice is a non-random access picture.

Referring to FIG. 4, number information of all views may be obtained from an extension area of a sequence parameter [S410, S420]. In accordance with the number information of all views, view identification information of each of the views may be obtained [S430]. In accordance with the number information of all views, number information of reference views for a direction L0 of a random access picture of each view may be obtained [S441]. In accordance with the number information of the reference views for the direction L0 of the random access picture, view identification information of the reference view for the direction L0 of the random access picture may be obtained [S442]. In the same manner of the step S441 and the step S442, information on a direction L1 may be obtained [S444, S445]. In doing so, it may be able to check whether a profile identifier of a received bitstream indicates a bitstream coded as a stereo video [S443]. If the profile identifier indicates the bitstream coded as the stereo video, it may be able to skip the information on the direction L1 instead of obtaining the corresponding information. On the contrary, if the profile identifier does not indicate the bitstream coded as the stereo video, the information on the direction L1 may be obtained [S444, S445].

Yet, even if the received bitstream is a multiview video coded bitstream in accordance with the profile identifier, it may be able to be decoded by a decoder of a stereo profile in accordance with a compatibility indication flag (constraint_setX_flag). In this case, the compatibility indication flag may mean the information that indicates whether a bitstream is decodable by a decoder of a prescribed profile. Referring to FIG. 5, when a bitstream is a multiview video coded bitstream, if the bitstream is decodable by a decoder of a stereo profile in accordance with the compatibility indication flag information, it may be able to skip the information on the direction L1 instead of obtaining the corresponding information. Hence, if a profile identifier does not indicate a stereo video coded bitstream and only if the bitstream is not a multiview video coded bitstream or the bitstream is not decodable by a decoder of a stereo profile in accordance with the compatibility indication flag information [S510], it may be able to obtain the information on the direction L1 [S520, S530].

Moreover, the above-mentioned steps S510 to S530 may be identically applicable to a non-random access picture. This is shown in the steps S540 to S560, of which details shall be omitted from the following description.

According to another embodiment of the present invention, unlike the former description with reference to FIG. 4 and FIG. 5, if a profile identifier of a received bitstream indicates a bitstream coded as a stereo video [S620], the inter-view reference information described with reference to FIG. 1 is not transmitted all but another information may be transmitted to replace the inter-view reference information.

Referring to FIG. 6, this transmitted information may include one of each view identification information (view_id [i]) of all views [S640], flag information (anchor_ref_flag) indicating whether a random access picture is used for inter-view prediction [S650], and flag information (non_anchor_ref_flag) indicating whether a non-random access picture is used for inter-view prediction [S660]. In this case, the 2 flag informations may be meaningful only if a random access picture or a non-random access picture corresponds to a base view. If a random access picture or a non-random access picture corresponds to a non-base view, since it may not be used as a reference picture, the 2 flag informations may always have a value set to 'false'.

As mentioned in the foregoing description with reference to FIG. 2, since the base view V0 is independently codable without referring to another view, inter-view reference information may be unnecessary. Since the non-base view V1 is able to use the base view V0 as a reference view only, it may not be necessary to send a number of reference views for a direction L0/L1 and view identification information of the reference views all.

Hence, only if a profile identifier of a received bitstream does not indicate a bitstream coded as a stereo video [S610], coding efficiency may be enhanced by obtaining inter-view reference information of a multiview video.

Yet, even if a profile identifier of a received bitstream does not indicate a bitstream coded as a stereo video, it may be decoded by a decoder of a stereo profile in accordance with a compatibility indication flag (constraint_setX_flag).

Referring to FIG. 7, if a bitstream is a multiview video coded bitstream and the bitstream is decodable by a decoder of a stereo profile in accordance with the compatibility indication flag information of if the bitstream is a stereo video coded bitstream in accordance with a profile identifier [S720], it may be able to obtain a flag information (anchor_ref_flag) indicating whether a random access picture is used for an inter-view prediction [S730] and a flag information (non-anchor_ref_flag) indicating whether a non-random access picture is used for an inter-view prediction [S740]. On the contrary, only if a profile identifier does not indicate a stereo video coded bitstream and the bitstream is not a multiview video coded bitstream or only if the bitstream is not decodable by a decoder of a stereo profile [S710], it may be able to obtain an inter-view reference information of the multiview video.

Thus, by checking whether a bitstream is a stereo video coded bitstream using a profile identifier or a compatibility indication flag information, it may be able to adaptively utilize an inter-view reference information of a multiview video.

Moreover, it may be able to determine whether to obtain the inter-view reference information of the multiview video using a stereo flag. In this case, the stereo flag may mean an information indicating whether a coded video sequence follows a stereo profile.

Referring to FIG. 8, it may be able to obtain the stereo flag from an extension area of a sequence parameter set [S810]. In accordance with the stereo flag, if the coded video sequence does not follow a stereo profile, it may be able to obtain an inter-view reference information of a multiview video [S820]. Yet, if the video sequence follows the stereo profile [S830], it may be able to obtain a flag information (anchor_ref_flag) indicating whether a random access picture is used for an inter-view prediction [S840] and a flag information (non-anchor_ref_flag) indicating whether a non-random access picture is used for an inter-view prediction [S850]. And, it may be able to initialize a reference picture list using the formerly obtained flag informations.

Alternatively, referring to FIG. 9, after the stereo flag has been obtained from the extension area of the sequence parameter set [S910], if the coded video sequence follows the stereo profile as a result in accordance with the stereo flag, it may be able to skip the information on the direction L1 instead of obtaining the corresponding information. Yet, if the profile identifier does not indicate the stereo video coded bitstream [S920], the information on the direction L1 may be obtained [S930, S940]. This may be identically applicable to a case that an inter-view reference picture is a non-random access picture, which is shown in the steps S950 to S970.

As mentioned in the foregoing description, an access unit may mean a set of pictures existing on a same time zone and the pictures may be defined to have a same picture order count and a same video format. Moreover, pictures belonging to the same access unit may be defined as having the same video format. For instance, if a picture of a base view is coded into a frame, a picture of a non-base view belonging to the same access unit of the base view may be coded into a frame as well. If the picture of the base view is coded into a field, the picture of the non-base view may be coded into a field. In particular, a field picture structure flag (field_pic_flag) for each of the picture of the base view and the picture of the non-base view may have the same value. Moreover, if the picture of the base view is coded into a macroblock adaptive frame/field, the non-base picture may be coded into a macroblock adaptive frame/field as well. In particular, a field frame switch flag (mb_adaptive_frame_field_flag) for each of the picture of the base view and the picture of the non-base view may have the same value. If the picture of the base view corresponds to a top field, the picture of the non-base view may correspond to a top field. If the picture of the base view corresponds to a bottom field, the picture of the non-base view may correspond to a bottom field. In particular, a bottom field indicating flag (bottom_field_flag) for each of the picture of the base view and the picture of the non-base view may have the same value. In this case, the bottom field indicating flag (bottom_field_flag) may mean a flag that indicates whether a current picture corresponds to a top field or a bottom field.

In case of a stereo video, a picture belonging to a non-base view may perform inter-view prediction using a decoded sample of a picture belonging to a base view. Likewise, the picture of the base view and the picture of the non-base view may belong to the same access unit and may follow the aforesaid definition of the access unit.

Meanwhile, if a profile identifier of a received bitstream indicates bitstream coded as a stereo video, it may be able to define that a field pair, i.e., a top field and a bottom field belong to a same access unit for a picture coded into a field. This may be named a modified access unit in the following description.

The relevance between an inter-view prediction and a coding format of picture in the modified access unit may be described as follows.

FIG. 10 is a diagram of a reference picture for inter-view prediction in accordance with a coding format of a picture in a base view and a picture in a non-base view according to an embodiment of the present invention.

Referring to FIG. 10(*a*), a picture of a base view is coded into a field and the picture of the base view corresponds to a top field. In order for a picture of a non-base view to use the picture of the base view as an inter-view reference picture, as mentioned in the foregoing description, the picture of the non-base view should correspond to a top field as well. Yet, without being limited by the former description, since top and bottom fields of a base view belong to the same access unit in accordance with the definition of the modified access unit, the top field of the non-base view may be able to use the bottom field of the base view as an inter-view reference picture.

Referring to FIG. 10(b), a picture of a base view is coded into a field and a picture of a non-base view is coded into a macroblock adaptive frame/field. Since top and bottom fields of the base view belong to the same access unit in accordance with the definition of the modified access unit, the picture of the non-base view may be able to perform inter-view prediction using the picture of the base view, i.e., the top field and the bottom field as inter-view reference pictures.

On the contrary, referring to FIG. 10(c), a picture of a base view is coded into a macroblock adaptive frame/field and a picture of a non-base view is coded into a field. In this case, the picture of the non-base view, i.e., top field or bottom field may be able to use the picture of the base view coded into the macroblock adaptive frame/field for inter-view prediction.

Figure 11:
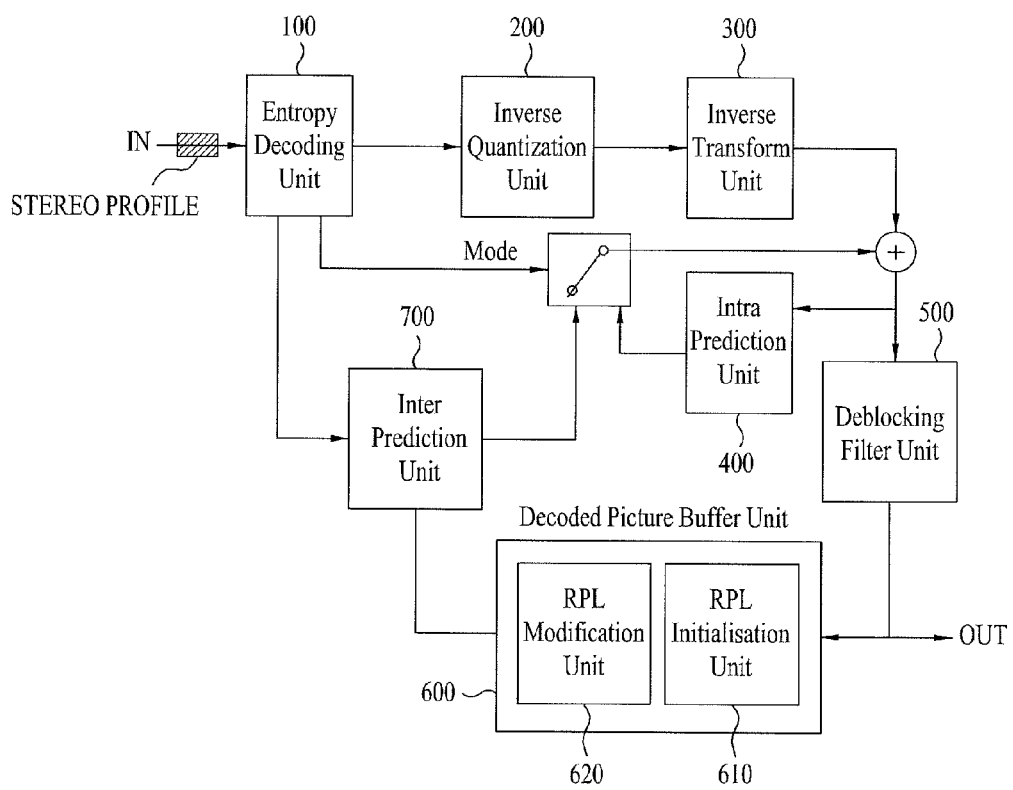
FIG. 11 is a schematic block diagram of a multiview video signal decoding apparatus according to an embodiment of the present invention.

FIG. 11 is a schematic block diagram of an apparatus for decoding a multiview video signal according to the present invention.

Referring to FIG. 1, the decoding apparatus may include an entropy decoding unit 100, a dequantizing unit 200, an inverse transform unit 300, an intra-prediction unit 400, a deblocking filter unit 500, a decoded picture buffer unit 600, an inter-prediction unit 700, and the like. And, the decoded picture buffer unit 600 may include a reference picture list initializing unit 610 and a reference picture list modifying unit 620.

The entropy decoding unit 200 performs entropy decoding on a parsed bitstream and a coefficient of each macroblock, a motion vector and the like are then extracted. The dequantizing unit 200 obtains a coefficient value transformed by multiplying a received quantized value by a predetermined constant and the inverse transform unit 300 then transforms the coefficient value inversely to reconstruct a pixel value. Using the reconstructed pixel value, the intra-prediction unit 400 performs intra-picture prediction from a decoded sample within a current picture. Meanwhile, the deblocking filter unit 500 is applied to each coded macroblock to reduce block distortion. A filter may smooth a block edge to enhance an image quality of a decoded frame. Selection of a filtering process depends on a boundary strength and a gradient of an image sample around a boundary. Pictures through filtering are outputted or saved in the decoded picture buffer unit 600 to be used as reference pictures.

Figure 12:
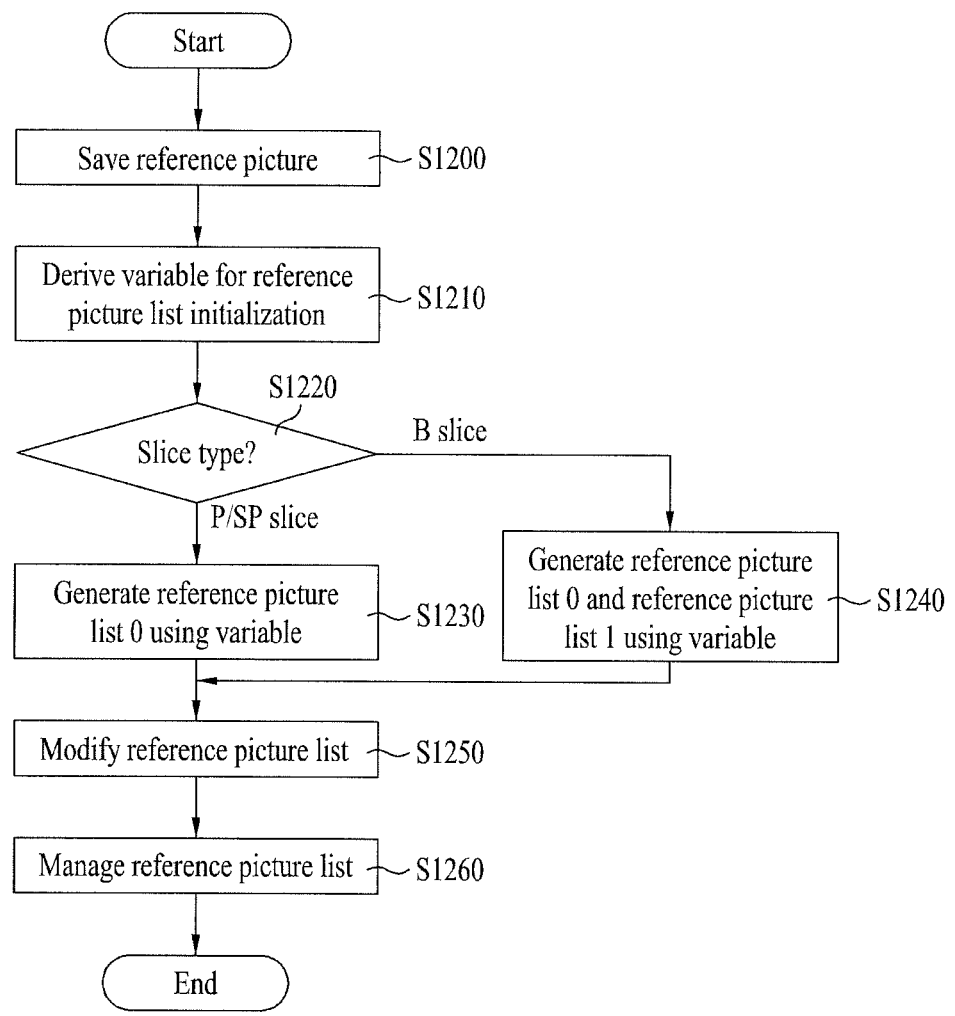
FIG. 12 is a flowchart for creating a reference picture list according to an embodiment of the present invention.

FIG. 12 is a flowchart for creating a reference picture list according to an embodiment of the present invention.

The decoded picture buffer unit 600 plays a role in storing or opening the previously coded pictures to perform inter-picture prediction. In doing so, a picture may be identified using a frame number and POC (picture order count) of the picture. In MVC, since pictures in a view different from that of a current picture exists among the previously coded pictures, in order to use these pictures as reference pictures, view information for identifying a picture may be usable together with the frame number and the POC. Yet, a reference picture used for the inter-view prediction only may be identified using the view identification information and the POC. The decoded picture buffer unit 600 stores pictures that will be referred to for the coding of the current picture [S1210]. And, the decoded picture buffer unit 600 constructs a list of reference pictures that will be referred to for the inter-picture prediction. In multiview video coding, since inter-view prediction may be performed, if a current picture refers to a picture in another view, it may be able to construct a reference picture list for the inter-view prediction. Moreover, it may be able to construct a reference picture list for performing both temporal prediction and inter-view prediction. For instance, if a current picture refers to a picture in a diagonal direction, it may be able to construct a reference picture list in the diagonal direction. In this case, there are various methods for constructing the reference picture list in the diagonal direction. For example, it may be able to define information (ref_list_idc) for identifying a reference picture list. If ref_list_idc=0, it may indicate a reference picture list for temporal prediction. If it is 1, it may indicate a reference picture list for inter-view prediction. If it is 2, it may indicate a reference picture list for both temporal prediction and inter-view prediction. The reference picture list in the diagonal direction may be constructed using the reference picture list for the temporal prediction or the reference picture list for the inter-view prediction. For instance, it may be able to align reference pictures in a diagonal direction in a reference picture list for temporal prediction. Alternatively, it may be able to align reference pictures in a diagonal direction in a reference picture list for inter-view prediction. Thus, if lists in various directions are constructed, more efficient coding may be possible. In this disclosure, the reference picture list for the temporal prediction and the reference picture list for the inter-view prediction are mainly described. And, the concept of the present invention may be further applicable to a reference picture list in a diagonal direction as well.

The decoded picture buffer unit 600 may include a variable deriving unit (not shown in the drawing), a reference picture list initializing unit 610 and a reference picture list modifying unit 620. The variable deriving unit (not shown in the drawing) may derive variables used for reference picture list initialization [S1210].

For instance, one of a $1^{st}$ frame number (FrameNum), a $2^{nd}$ frame number (FrameNumWrap), a picture number (PicNum), a long-term frame number (LongTermFrameIdx), a long-term picture number (LongTermPicNum) and the like may be used as the variable. In case of a short-term reference picture, the $1^{st}$ frame number may be determined using a frame number (frame_num) obtained from a slice header area of the short-term reference picture. For instance, the $1^{st}$ frame number may be set to a value equal to a frame number (frame_num) obtained from a slice header area of the short-term reference picture. The $2^{nd}$ frame number may be usable for the decoded picture buffer unit 600 to assign a small number to each reference picture and may be derivable based on the $1^{st}$ frame number. For instance, a frame number (frame_num) obtained from a slice header area of a current picture and the $1^{st}$ frame number is compared with each other. If the $1^{st}$ frame number is greater, the $2^{nd}$ frame number may be derived into a value resulting from subtracting a maximum value (MaxFrameNum) of the $1^{st}$ frame number from the $1^{st}$ frame number. Yet, if the $1^{st}$ frame number is smaller or equal, the $2^{nd}$ frame number may be derived into a value equal to the $1^{st}$ frame number. In this case, the current picture may mean a picture that is coded using the short-term reference picture.

Using the derived $2^{nd}$ frame number (FrameNumWrap), it may be able to derive a picture number (PicNum) or a long-term picture number (LongTermPicNum) that will be assigned to a reference picture. In this case, the picture number (PicNum) or the long-term picture number (LongTermPicNum) may mean an identification number of a picture used by the decoded picture buffer unit 600. Specifically, in case that a long-term reference picture is indicated, it may be able to use the long-term picture number (LongTermPicNum). Meanwhile, the picture number (PicNum) or the long-term picture number (LongTermPicNum) may be derivable based on a field picture flag (field_pic_flag) for the current picture and a bottom field flag (bottom_field_flag). In this case, the field picture flag may indicate the information indicating whether a current picture is a field picture or a frame picture. And, the bottom field flag may mean the information indicating whether a current picture is a top field or a bottom field. The field picture flag and the bottom field flag may be obtained from a slice header area for the current picture. For instance, if a current picture is a frame picture in accordance with the field picture flag, the picture number (PicNum) or the long-term picture number (LongTermPicNum) may be derived from the $2^{nd}$ frame number or the long-term frame number. The long-term frame number may mean a frame number assigned to a long-term reference picture. Yet, if the current picture is a field picture in accordance with the field picture flag, the picture number (PicNum) or the long-term picture number (LongTermPicNum) is derived based on the $2^{nd}$ frame number or the long-term frame number and may be derived in accordance with whether the current picture corresponds to a field co-located with a reference field.

Moreover, when a reference picture list for an inter-view prediction is constructed, the variables may be derived in the same manner mentioned in the forgoing description and the reference picture list for the inter-view prediction may be initialized using the derived variables.

The reference picture list initializing unit 610 initializes a reference picture list using the above-mentioned variables. In doing so, a scheme of a reference picture list initializing process may vary in accordance with a slice type [S1220]. First of all, if a slice type is a P slice or an SP slice, a reference picture list 0 may be created [S1230]. In case of decoding the P slice or the SP slice, it may be able to assign a reference number based on a decoding order. For instance, the arrangement may be performed in accordance with a picture number or a long-term picture number which is derived from a $1^{st}$ frame number or a long-term frame number. Short-term reference pictures may be initialized ahead of a long-term reference picture. The short-term reference pictures may be arranged in order from a reference picture having a highest picture number to a picture having a lowest picture number among reference pictures. And, the long-term reference pictures may be arranged in order from a reference picture having a lowest picture number to a picture having a highest picture number among reference pictures.

If a slice type is a B slice, a reference picture list 0 and a reference picture list 1 may be created [S1240]. When the B slice is coded, in case of a short-term reference picture, reference pictures may be arranged in accordance with a picture order count. In case of a long-term reference picture, reference pictures may be arranged in accordance with a long-term picture number (LongTermPicNum). In particular, the short-term reference pictures may be initialized ahead of the long-term reference pictures. For instance, For instance, regarding the arrangement order of the short-term reference pictures of the reference picture list 0, the short-term reference pictures may be arranged in order from a reference picture having a highest picture order count to a reference picture having a lowest picture order count among reference pictures, each of which picture order count is lower than that of a current picture, and may be then arranged in order from a reference picture having a lowest t picture order count to a reference picture having a highest picture order count among reference pictures, each of which picture order count is higher than that of the current picture. Regarding the arrangement order of the long-term reference pictures of the reference picture list 0, the long-term reference pictures may be arranged in order from a reference picture having a lowest picture order count to a reference picture having a highest picture order count among reference pictures.

Since an inter-view prediction is possible in multiview video coding, it may be able to create a reference picture list for the inter-view prediction. As mentioned in the foregoing description with reference to FIG. 1, inter-view reference pictures used for the inter-view prediction may include a reference picture used for the inter-view prediction only and a reference picture used for both a temporal prediction and an inter-view prediction. And, the inter-view reference picture may be included in the reference picture list.

In the following description, a process for initializing the inter-view prediction pictures may be described. First of all, the inter-view reference pictures may be arranged based on inter-view reference information. Since the inter-view reference information is obtained in accordance with whether a current slice is a random access picture or a non-random access picture, the inter-view reference information may be initialized in a manner of being categorized into a case of a random access picture and a case of a non-random access picture. As mentioned in the foregoing description with reference to FIG. 1, whether a current slice is a random access picture or a non-random access picture may be determined based on random access flag information. For instance, if the current slice is a random access picture in accordance with the random access flag information, an inter-view reference picture, which belongs to the same access unit of the current slice and which has the same view identification information of an inter-view reference picture for the current slice, may be added to the reference picture list. This may be obtained based on number information of inter-view reference pictures for the current slice. For instance, the inter-view reference pictures may be added to the reference picture list a many as the number of the inter-view reference pictures. Likewise, if a current slice is a non-random access picture, it may be able to initialize a reference picture list for an inter-view prediction using inter-view reference information on the current slice.

In the following description, a method of creating a reference picture list for an inter-view prediction in accordance with the definition of the modified access unit mentioned in the foregoing description may be explained.

Besides, it may be apparent that the above-mentioned reference picture list creating method is identically applicable to the case in accordance with the definition of the access unit.

First of all, it may be able to obtain inter-view prediction flag information for a picture of a base view. In case that the picture of the base view is used as an inter-view reference picture of a non-base view in accordance with the inter-view prediction flag information, a reference index for an inter-view prediction may be assigned to the picture of the base view and may be added to a reference picture list for a temporal prediction of the picture of the non-base view. Meanwhile, the picture of the base view may be added to the reference picture list for the temporal prediction based on a random access flag. In particular, in accordance with whether the picture of the non-base view is a random access picture or a non-random access picture, it may be ale to create a reference picture list for the inter-view prediction. After a flag information (anchor_ref_flag) indicating whether the random access picture is used for the inter-view prediction or a flag information (non_anchor_ref_flag) indicating whether the non-random access picture is used for the inter-view prediction has been obtained, if the picture of the base view is used for the inter-view prediction in accordance with the flag information, it may be able to create a reference picture list for the inter-view prediction.

Moreover, if the picture of the base view is used as an inter-view reference picture, it may be able to obtain a picture coding structure flag (field_pic_flag) for the picture of the base view. In case that the picture of the base view is coded into a field in accordance with the picture coding structure flag (field_pic_flag), it may be able to obtain a bottom field indication field (bottom_field_flag) in addition. It may be able to determine whether the picture of the base view corresponds to a top field or a bottom field in accordance with the bottom field indication flag (bottom_field_flag). Accordingly, it may be able to assign a reference index to each of the top field and the bottom field. A method of assigning the reference index shall be explained in detail with reference to FIG. 13 as follows.

FIG. 13 is a diagram for a method of assigning a reference index to a picture in a base view, if the picture in the base view is coded into a field, according to an embodiment of the present invention.

Referring to FIG. 13(*a*), a top filed of a base view in a reference picture list for inter-view prediction may be set to have a reference index smaller than that of a bottom field of the base view belonging to the same access unit. Alternatively, referring to FIG. 13(*b*), a bottom field of a base view may be set to have a reference index smaller than that of a top field of the base view belonging to the same access unit.

Based on a coding format of a picture of a non-base view, a reference index may be assigned to a picture of a base view, i.e., a top field and a bottom field. Referring to FIG. 13(*c*), in case that a picture of a non-base view corresponds to a top field, it may be able to assign a reference index smaller than that of a bottom field to a top field of the picture of the base view. Alternatively, referring to FIG. 13(*d*), in case that a picture of a non-base view corresponds to a bottom field, it may be able to assign a reference index smaller than that of a top field to a bottom field of the picture of the base view. Based on the created reference picture list, it may be able to predict a pixel value of a macroblock in the picture of the non-base view.

The reference picture list modifying unit 620 plays a role in improving a compression ratio by assigning a smaller index to a picture frequently referred to in the initialized reference picture list [S1250]. Since a reference index for designating a reference picture may be coded by a unit of block, as the reference index gets smaller, a code amounting to a smaller number of bits may be assigned.

Figure 14:
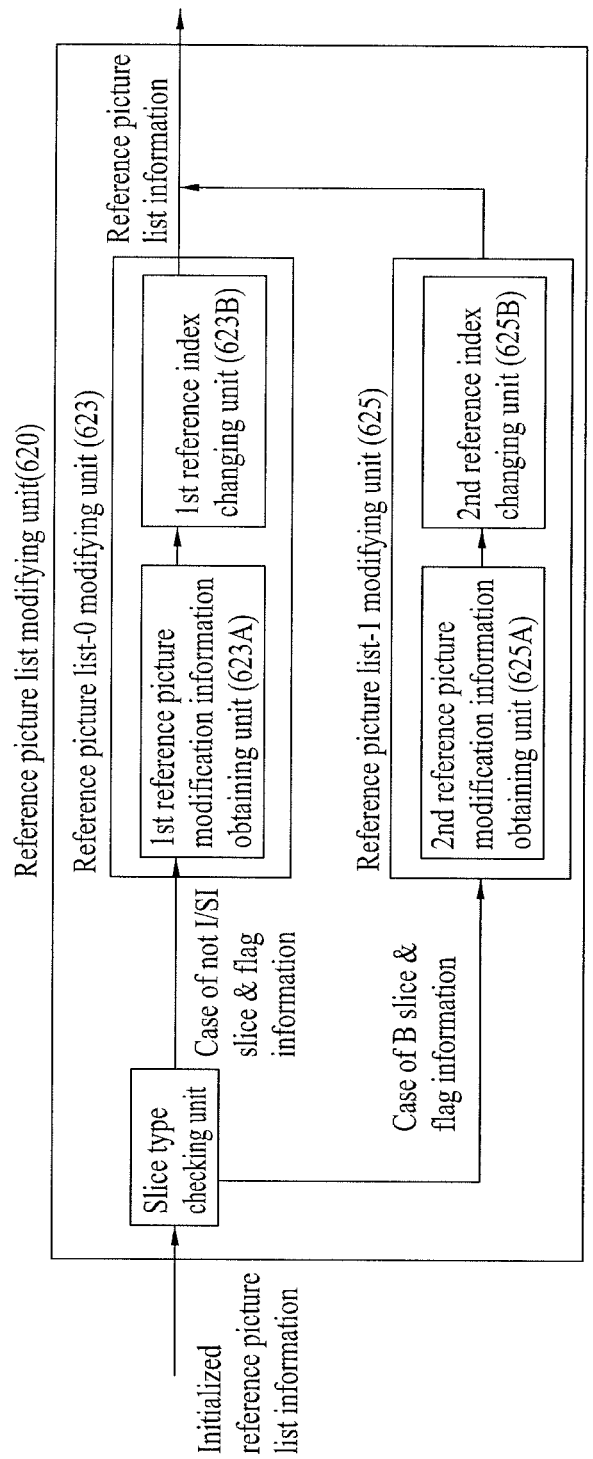
FIG. 14 is an internal block diagram of a reference picture list modifying unit 620 according to an embodiment of the present invention.

FIG. 14 is an internal block diagram of a reference picture list modifying unit 620 according to an embodiment of the present invention. FIG. 16 is an internal block diagram of a reference index changing unit 623B/625B according to an embodiment of the present invention.

Referring to FIG. 14, the reference picture list modifying unit 620 includes a slice type checking unit 621, a reference picture list-0 modifying unit 623 and a reference picture list-1 modifying unit 625. If an initialized reference picture list is inputted, the slice type checking unit 621 checks a type of slice to be decoded and then determines whether to modify a reference picture list 0 or a reference picture list 1. For instance, if the slice type is either an I slice nor an SI slice, the reference picture list-0 modifying unit 623 may be able to modify the reference picture list 0. If the slice type is a B slice, the reference picture list-1 modifying unit 625 may be able to modify the reference picture list 1. The reference picture list-0 modifying unit 623 may include a reference picture modification information obtaining unit 623A and a reference index changing unit 623B. The reference picture list-1 modifying unit 625 may include a reference picture modification information obtaining unit 625A and a reference index changing unit 625B.

Figure 15:
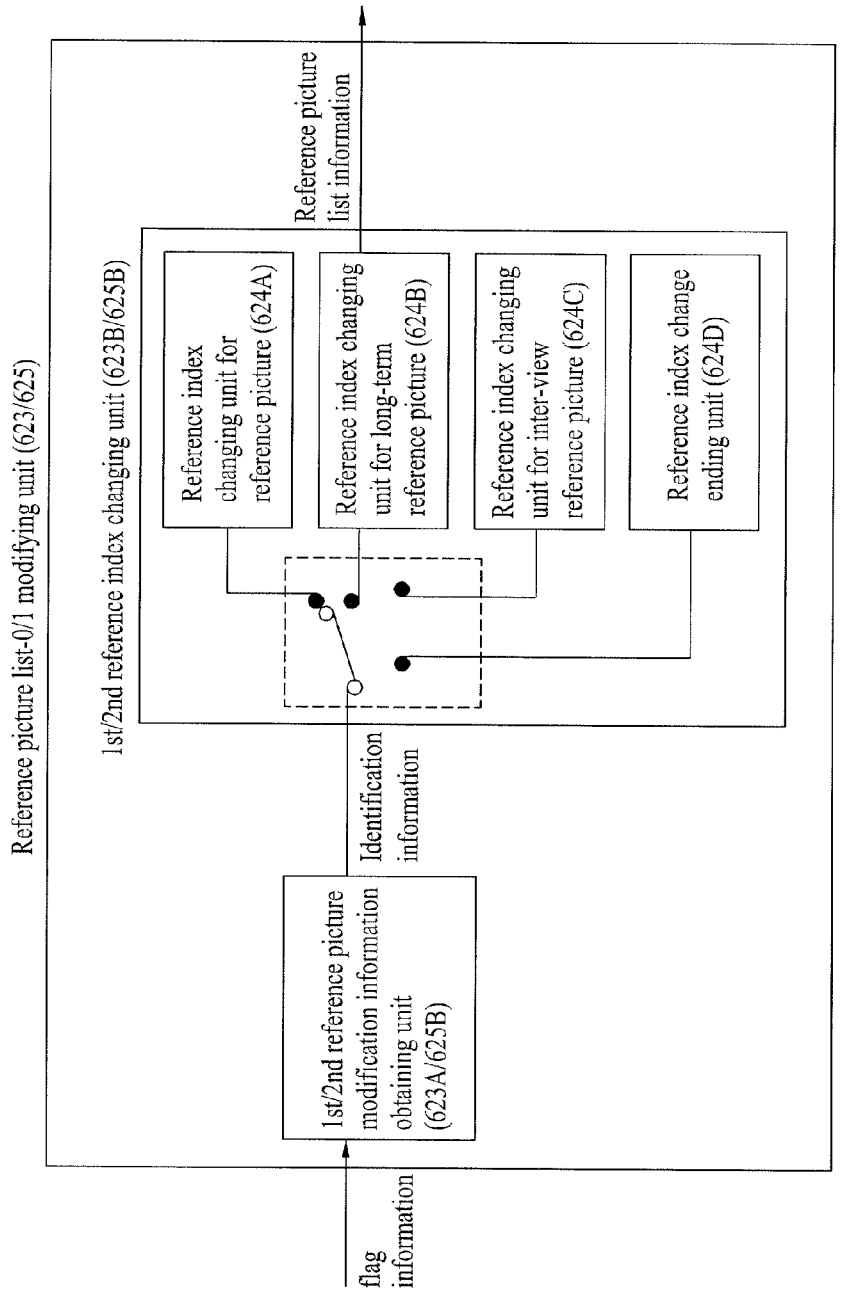
FIG. 15 is an internal block diagram of a reference index changing unit 623B/625B according to an embodiment of the present invention.

Referring to FIG. 15, when the reference picture list is modified in accordance with a flag information (ref_pic_list_modificatoin_flag) indicating whether to modify a reference picture list, the reference picture modification information obtaining unit 623A/625B may be able to obtain a reference picture modification information (modification_of_pic_nums_idc). In this case, the reference picture modification information may mean the information that specifies a reference picture to be modified among reference pictures in an initialized reference picture list. Moreover, based on the reference picture modification information, it may be able to obtain a difference value of a picture number and a long-term picture number. In this case, the difference value of the picture number may mean a difference between a picture number of a current picture and a predicted picture number. And, the predicted picture number may mean the index of a reference picture that was assigned just before.

For instance, when a reference index of a reference picture is changed in accordance with the reference picture modification information, the reference index changing unit 624A for the reference picture is activated. And, the reference index changing unit 624A for the reference picture may be able to obtain a difference value of the picture number. When a reference index of a long-term reference picture specified in accordance with the reference picture modification information is changed, the reference index changing unit 624B for the long-term reference picture is activated. And, the reference index changing unit 624B for the long-term reference picture may be able to obtain a long-term picture number of the long-term reference picture specified in accordance with the reference picture modification information. Yet, in case of ending the reference index change in accordance with the reference picture modification information, a reference index change ending unit 624D is activated and may be able to end the reference index change.

The reference index changing unit 623B/625B may be able to modify a reference picture list by changing a reference index of a reference picture using the reference picture modification information, a difference value of a picture number and a long-term picture number.

For instance, if a reference picture is a short-term reference picture, it may be able to derive a modified reference index based on a predicted picture number and a difference value of the picture number. Yet, the modified reference index may be derived in a manner of subtracting/adding the difference value of the reference index from/to the predicted picture number in accordance with the reference picture modification information. If a reference picture is a long-term reference picture, it may be able to modify a reference picture list based on a long-term picture number.

In multiview video coding, the above-mentioned reference picture list modifying method may be identically applicable. In the following description, additional parts according to the multiview video coding shall be mentioned.

First of all, since an inter-view prediction is possible in multiview video coding, reference picture modification information may mean the information for specifying a modified reference picture or an inter-view reference picture among reference pictures in an initialized reference picture list or inter-view reference pictures in a reference picture list for an initialized inter-view prediction. The reference picture modification information obtaining unit may be able to additionally obtain a difference value of a view information based on the reference picture modification information as well as the reference picture modification information, a difference value of a picture number and a long-term picture number. In this case, the difference value of the view information may mean a difference between a view index of a current picture and a view index of a predicted view index. And, the predicted view index may mean a view index of a reference picture assigned just before. Using the obtained difference value of the view information, it may be able to change a reference index of an inter-view reference picture of a reference picture list for an inter-view prediction.

For instance, when a reference index of an inter-view reference picture is changed in accordance with the reference picture modification information, the reference index changing unit 624C for the inter-view reference picture is activated. And, the reference index changing unit 624C may be then able to obtain the difference value of the view information. Subsequently, based on the difference value of the view information and the predicted view index, it may be able to derive a modified view index (picViewIdxLX). Yet, the modified view index may be derived in a manner of subtracting/adding the difference value of the view information from/to the predicted view index in accordance with the reference picture modification information. Based on the modified view index, it may be able to derive a target view identifier (targetViewID). The target view identifier may be derived from the view identification of the inter-view reference picture having the modified view index. Meanwhile, the target view identifier may be derived from random access flag information. In particular, the target view identifier may be derived in a manner of being identified in accordance with whether a current slice is a random access picture or a non-random access picture. Using an inter-view reference picture having the same view identification information of the target view identifier, it may be able to modify a reference picture list for an inter-view prediction.

Figure 18:
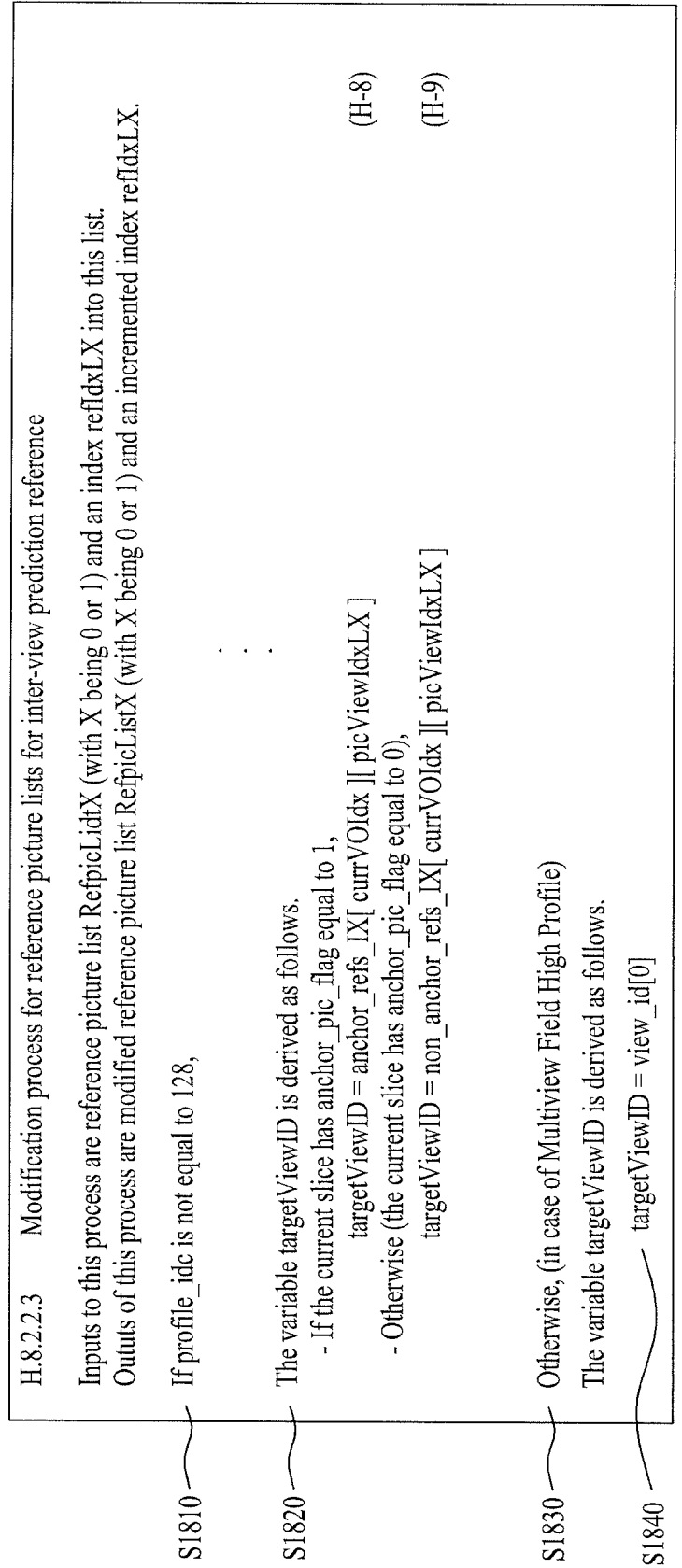

FIGS. 16 to 18 are diagrams for syntax of modifying a picture list referred to for temporal or inter-view prediction.

In case that a profile identifier of a received bitstream indicates a bitstream coded into a stereo video, the above-mentioned reference picture list modifying method may be identically applicable. Yet, a method of modifying a reference picture list for an inter-view prediction may be different. This is because 2 views exist in a stereo video coded bitstream only. And, it may be able not to code a difference value of view information.

Referring to FIG. 16, it may be able to obtain a difference value of the view information based on the reference picture modification information and the profile identifier. For instance, when a slice type is neither an I slice or an SI slice [S1610], if the reference picture modification information indicates to change a reference index of an inter-view reference picture and only if the profile identifier indicates that a received bitstream is not a stereo video coded bitstream [S1620], it may be able to obtain a difference value of the view information [S1630]. Yet, even if the reference picture modification information indicates to change the reference index of the inter-view reference picture, the difference value of the view information may not be obtained in case of the stereo video coded bitstream. If a slice type is a B slice [S1640], it may be able to obtain the difference value of the view information by the same process [S1650, S1660].

According to another embodiment, reference to FIG. 17, even if a received bitstream is a multiview video coded bitstream in accordance with a profile identifier, it may be decoded by a decoder of a stereo file in accordance with a compatibility indication flag (constraint_setX_flag). For instance, when a bitstream is a multiview video coded bitstream, if the bitstream is decoded by a decoder of a stereo profile in accordance with the compatibility indication flag information, a difference value of the view information may not be obtained. Hence, if the reference picture modification information indicates to change a reference index of an inter-view reference picture, if the profile identifier indicates that the received bitstream is not the stereo video coded bitstream, if the profile identifier indicates that the received bitstream is not a multiview video coded bitstream or the compatibility indication flag indicates that the bitstream is not decodable by the decoder of the stereo profile [S1710, S1730], it may be able to obtain the difference value of the view information [S1720, S1740].

FIG. 18 is a diagram for a method of deriving a target view identifier in case of a stereo video.

Referring to FIG. 18, if a bitstream is not a stereo video coded bitstream [S1810], it may be able to derive a target view identifier by the above-mentioned target view identifier deriving method [S1820]. If a bitstream is a stereo video coded bitstream [S1830], since a base view is used as a reference view of a non-base view, the target view identifier may be derived based on view identification information of the base view [S1840].

The reference picture managing unit (not shown in the drawing) may manage reference pictures to realize inter-picture prediction more flexibly [S1260]. For instance, a memory management control operation method and a sliding window method may be usable. This is to manage a reference picture memory and a non-reference picture memory by unifying the memories into one memory and to realize efficient memory management with a small memory. In multiview video coding, since pictures in a view direction have the same picture order count, information for identifying a view of each of the pictures may be usable in marking them. Through this process, reference pictures managed in the above manner may be used by the inter-prediction unit 700.

The inter-prediction unit 700 may perform inter-picture prediction using a reference picture saved in the decoded picture buffer unit 600 or an inter-view reference picture. An inter-mode coded macroblock may be divided into macroblock partitions. Each of the macroblock partitions may be predicted from one or two reference pictures or an inter-view reference picture. The inter-prediction unit 700 compensates for a motion of a current block using informations transferred from the entropy decoding unit 100. Motion vectors of blocks neighbor to the current block are obtained from a video signal and a motion vector predicted value of the current block may be then obtained from the obtained motion vector. And, the motion of the current block may be compensated using the obtained motion vector predicted value and a differential vector obtained from the video signal. Moreover, it may be able to perform the motion compensation using one reference picture or a plurality of pictures. In multiview video coding, in case that a current picture refers to pictures in different views, it may be able to perform motion compensation using information on the inter-view prediction reference picture list saved in the decoded picture buffer unit 600. And, it may be also able to perform motion compensation using view identification information of the inter-view reference picture. A direct mode is a coding mode for predicting motion information of a current block from a motion information on a coding ended block. Since this method saves the number of bits necessary for coding of the motion information, a compression efficiency may be enhanced. For instance, a temporal direct mode may predict motion information of a current block using motion information correlation in a time direction. Similarly to this method, the present invention may be able to predict motion information of a current block using motion information correlation in a view direction. Through this process, inter-mode predicted pictures and intra-mode predicted pictures may be selected in accordance with the prediction mode to reconstruct a current picture.

INDUSTRIAL APPLICABILITY

Accordingly, the present invention may be applicable to processing of a multiview video signal.

FIG. 10
base view, non-base view, inter-view prediction
FIG. 12
Start
Save reference picture S1200
Derive variable for reference picture list initialization S1210
Slice type? S1220
B slice, P/SP slice
generate reference picture list 0 using variable S1230
generate reference picture list 0 and reference picture list 1 using variable S1240
modify reference picture list S1250
manage reference picture list S1260
End
FIG. 13
Case that a picture of a non-base view is a top field
Case that a picture of a non-base view is a bottom field
FIG. 14
reference picture list modifying unit 620
initialized reference picture list information
case of not I/SI slice & flag information
case of B slice & flag information
reference picture list information
slice type checking unit
reference picture list-0 modifying unit 623
$1^{st}$ reference picture modification information obtaining unit 623A, $1^{st}$ reference index changing unit 623B
reference picture list-1 modifying unit 625
$2^{nd}$ reference picture modification information obtaining unit 625A, $2^{nd}$ reference index changing unit 625B
FIG. 15
reference picture list-0/1 modifying unit 623/625
flag information, identification information, reference picture list information
$1^{st}/2^{nd}$ reference picture modification information obtaining unit 623A/625A
$1^{st}/2^{nd}$ reference index changing unit 623B/625B
reference index changing unit for reference picture 624A
reference index changing unit for long-term reference picture 624B
reference index changing unit for inter-view reference picture 624C
reference index change ending unit 624D

What is claimed is:

1. A method of changing a reference picture list, comprising:
    parsing a profile identifier and a slice type from a multiview video bitstream;
    obtaining inter-view reference information based on the profile identifier;
    initializing a reference picture list using the inter-view reference information; and
    modifying the reference picture list in consideration of the slice type,
    wherein when the multiview video bitstream is a stereo video coded bitstream in accordance with the profile identifier, the inter-view reference information is obtained,
    wherein the inter-view reference information includes flag information indicating whether a random access picture is used for an inter-view prediction and flag information indicating whether a non-random access picture is used for the inter-view prediction,
    wherein the random access is a coded picture in which all slices only refer to slices within a same access unit, and
    wherein the non-random access picture is a picture except the random access picture.

2. The method of claim 1, the modifying, comprising:
    obtaining flag information whether to modify the reference picture list;
    obtaining reference picture modification information based on the flag information;
    parsing a difference value of a picture number, a long-term picture number and a difference value of a view information; and
    deriving a modified reference index using the difference value of the picture number, the long-term picture number and the difference value of the view information,
    wherein when the slice type is not an I slice, the reference picture list is modified.

3. The method of claim 2, wherein the reference picture modification information is information for specifying a reference picture changed among reference pictures of the initialized reference picture list, and
    wherein the difference value of the picture number indicates a difference between a picture number of a current picture and a predicted picture number, and
    wherein the predicted picture number is a number of a reference picture assigned just before, and
    wherein the difference value of the view information means a difference between a view index of the current picture and a predicted view index, and
    wherein the predicted view index is a view index of the reference picture assigned just before.

4. The method of claim 2, wherein the difference value of the view information is parsed based on the reference picture information and the profile identifier.

5. The method of claim 2, wherein if the reference picture is a short-term reference picture, the modified reference index is derived based on a difference value between a predicted picture number and the picture number and wherein if the reference picture is a long-term reference picture, the modified reference index is derived based on the long-term picture number.

* * * * *